3,304,282
PRODUCTION OF GLASS FIBER REINFORCED THERMOPLASTICS

Anton Cadus, Otto Kaiser, and Reinhold Weber, Ludwigshafen (Rhine), Klaus Benker, Koenigsbach, Weinstrasse, and Hermann Uhr, Frankenthal, Pfalz, Germany, assignors to Badische Anilin- & Soda-Fabrik Aktiengesellschaft, Ludwigshafen (Rhine), Germany
No Drawing. Filed Aug. 16, 1965, Ser. No. 480,099
Claims priority, application Germany, Aug. 27, 1964, B 78,283
5 Claims. (Cl. 260—37)

This invention relates to a process for the production of glass fiber reinforced high molecular weight thermoplastics in which the plastic is supplied in the form of granulate or powder to an extruder or continuous kneader, endless glass fibers are introduced into the melt and broken up therein, and the mixture is homogenized and discharged.

It is known that the flow properties of thermoplastics may be improved by adding glass fibers, cut glass fibers being supplied with the plastics powder or granulate either separately or previously mixed together to the feed inlet to an extruder and the whole being homogenized after the plastic has melted. The length of the individual glass fibers is often thus shortened to such an extent that they lose their reinforcing function. Wear on the extruder is also very great and the products contain deleterious amounts of material from the screw and barrel. When using glass fibers cut into relatively long lengths, separate or joint metering, particularly in the case of a high proportion of glass fibers, offers considerable difficulty.

It is also known that glass fiber reinforced thermoplastics can be prepared by extruding materials which have been metered in separately. The plastics material is supplied in powder or granulate form through the feed inlet of the extruder and melted in the kneading zone. After the last kneading operation in the melting zone, glass fibers of short length are added and mixed with the melt. In this way, the length of the fibers undergoes little or no change during the mixing process. The fibers should accordingly be cut to the desired length, for example 0.1 to 1.5 mm. It is difficult technically to meter in these fibers uniformly.

It is also known to introduce endless glass fibers into a plastics melt and to extrude them, without having been broken up, with the plastic through nozzles, or to apply glass fiber bundles to the surface of plastics filaments after they have been extruded through jets. In both cases, the glass fibers are not distributed homogeneously in the plastic but lie in bunches parallel to the axis of the granulate on the surface of the granulate. It is not always possible to process granulate prepared in this way. Owing to the inhomogeneous distribution of the glass fiber component, thin-walled and complicated moldings cannot be prepared without trouble. There is also greater attrition in the processing machines.

We have now found that the said disadvantages in the production of glass fiber reinforced thermoplastics by mixing glass fibers with a melt of the plastic in a screw extruder having positive conveyance can be avoided by supplying endless glass fibers to the melt ahead of a treatment chamber defined by a kneading device and/or adjustable gap provided in the screw extruder, reducing the glass fibers in size in the melt, mixing them with the melt and continuously extruding the mixture. It is possible to set up the desired content of glass fibers without difficulty because the rate at which the glass fiber rovings is drawn in is proportional to the rate of rotation of the screw shaft and the number of rovings drawn in may be varied from one to twenty at will.

Glass fiber reinforced thermoplastics are obtained which have a high modulus of elasticity, great stiffness, good dimensional stability and high thermal stability under load. They have the advantage of better processability and a paler natural color than glass fiber reinforced thermoplastics prepared by prior art methods.

In an advantageous embodiment of the invention, thermoplastic in granulate or powder form is melted in a twin screw extruder having degassing means. The volatile constituents of the melt are removed in a manner which is conventional with extruders. The glass fibers are supplied through an inlet provided after the melting zone in the form of endless rovings, the desired glass fiber content in the plastic being set up by correlation of the rate of rotation of the screw shaft and the number and thickness of the rovings. The glass fibers are broken up to the desired size in the presence of the melt by a screw section located beyond the inlet for the glass fibers, and glass fibers of a great variety of lengths may be obtained by suitable choice of the kneading elements. The lengths of glass fibers are homogeneously mixed with the melt by mixing elements and after the melt has passed through a quiescent zone it is extruded in the usual way. The residence time of the mixture of glass fibers and thermoplastic in the extruder is from about 60 to 200 seconds.

It is advantageous that metering the glass fibers does not offer any difficulty. Strong wear of the machine, which is observed in the conventional methods, is avoided. Another advantage is that the length of the glass fibers may be controlled. Moreover, in contrast to the prior art methods, glass fiber reinforced thermoplastics having a content of 50% and more may be prepared in a single operation.

The process according to this invention is suitable for all thermoplastics prepared by conventional methods, for example polyolefins, polyvinyl chloride, styrene homopolymers, styrene copolymers, styrene graft polymers, polyesters and polyamides. The plastics may be used not only in powder form but also in the form of pieces, for example as a granulate, grinding stock or chips.

Screw extruders having positive conveyance include single and multi-shaft extruders, continuous kneaders or disc kneaders. Twin-shaft extruders that have screws which engage with one another and also degassing means and kneading means, such as kneading discs, kneading blocks and/or adjustable gaps are particularly suitable.

Endless rovings which consist of several (sometimes up to 100) fiber bundles having a very large number (sometimes more than 10,000) individual filaments are particularly suitable. The individual filaments have a mean diameter of about $10^{-3}$ to $10^{-4}$ cm. The fibers may be free from size or may be used with conventional sizes, such as plastics, silane products, chromium compounds and the like. If desired, the size may be removed by burning or dissolving it off prior to the introduction of the fibers into the extruder.

The thermoplastics may contain additives of conventional types, such as dyes, plasticizers, lubricants, stabilizers or optical brighteners. The additives may be added to the plastics before or after they have been melted, in carrying out the process according to this invention.

Thermoplastics reinforced with glass fibers in accordance with this invention are suitable for the production of moldings which are dimensionally stable and thermally stable under load and on which particularly high mechanical requirements are placed.

The invention is further illustrated by the following examples. The parts and percentages specified in the examples are by weight; the plastics used are prepared by conventional methods.

Example 1

A mixture of 80 parts of granulated nylon-6 and 0.5 parts of calcium stearate is melted at 220° C. in a twin-shaft screw extruder having two degassing pipes. The rate of rotation of the shafts is 105 r.p.m. 26 parts of glass fibers in the form of rovings is supplied through the degassing pipe which is nearest to the feed inlet. The glass fibers are broken up to lengths of 0.18 to 1.0 mm. in the melt by two sets of kneaders which are mounted on the shafts between the first degassing pipe and the shaping means of the extruder. The glass fibers are homogeneously mixed with the melt by subsequent mixing elements and the melt is thereafter discharged through a perforated die and the extrudate is broken up. The residence time of the mixture of glass fibers and polyamide melt within the extruder is 100 to 110 seconds.

Example 2

By using a mixture of 70 parts of nylon-6,10 and 0.5 part of calcium stearate, and also 46.6 parts of glass fibers, but otherwise following the procedure of Example 1, a polyamide is obtained which contains 40% of glass fibers having lengths between 0.18 and 1.9 mm. This polyamide is particularly suitable for the production of highly stressed mechanical parts, for example for the production of gear wheels.

Example 3

65 parts of polystyrene having a K-value (according to Fikentscher) of 63 is melted at 220° C. in a twin-shaft screw extruder having four degassing pipes. The rate of rotation of the shaft is 150 r.p.m. 35 parts of glass fiber rovings is introduced through a degassing pipe following the melt zone, moved forward with the melt through an annular gap of 2 mm. which breaks up the glass fibers to lengths of 0.1 to 1.5 mm. and at the same time mixes them with the melt. After the mixture has passed through a second mixing zone and a quiescent zone, it is extruded through a perforated die.

Example 4

78 parts of powdered copolymer of styrene and acrylonitrile which contains 2% of water and 1% of internal lubricant is melted in an extruder as described in Example 1 and 25 parts of glass fibers are worked in. A glass fiber reinforced styrene copolymer is obtained which is outstandingly suitable for the production of dimensionally stable moldings having increased thermal stability under load.

We claim:

1. A process for the production of glass fiber reinforced thermoplastics by mixing glass fibers with a melt of a thermoplastic in a screw extruder having conveying means the improvement which comprises supplying endless glass fibers to said melt ahead of the treatment chamber of said screw extruder, mixing said fibers with said melt and extruding the mixture continuously.

2. A process as claimed in claim 1 wherein 0.5 to 70 parts by weight of endless glass fibers is used for the production of 100 parts of glass fiber reinforced thermoplastic.

3. A process as claimed in claim 1 wherein 20 to 40 parts by weight of endless glass fibers is used for the production of 100 parts of glass fiber reinforced thermoplastic.

4. A process as claimed in claim 1 wherein the screw extruder is a twin screw extruder having degassing means.

5. A process as claimed in claim 1 wherein the residence time of the mixture of thermoplastic and glass fibers in the extruder is from 60 to 200 seconds.

No references cited.

MORRIS LIEBMAN, *Primary Examiner.*

H. S. KAPLAN, *Assistant Examiner.*